Nov. 2, 1971  T. E. DEARTH  3,616,487
BOX HINGE
Filed March 10, 1969
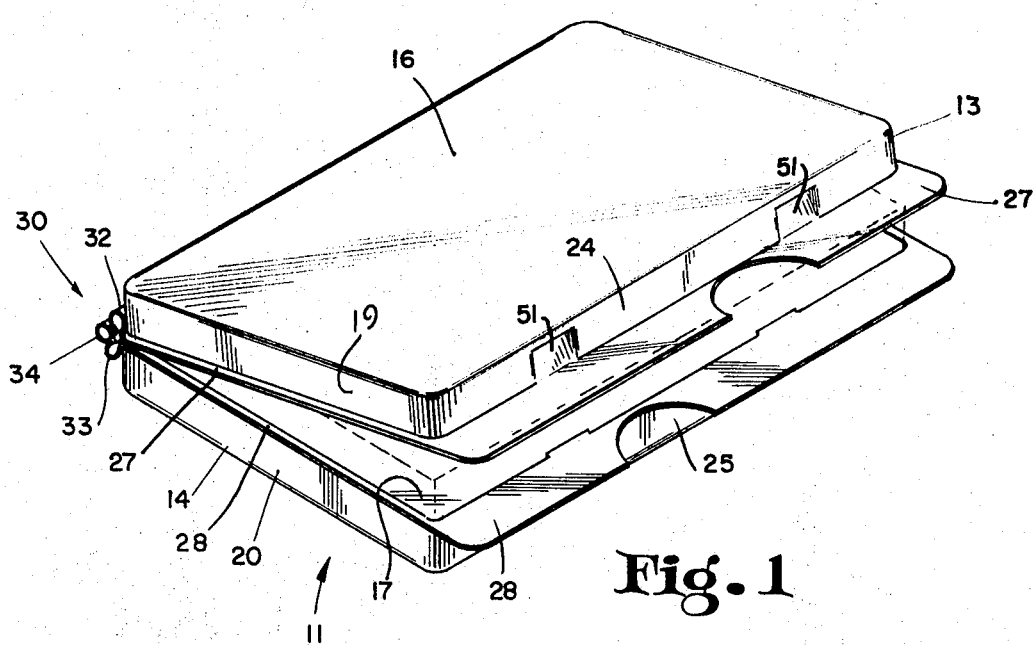
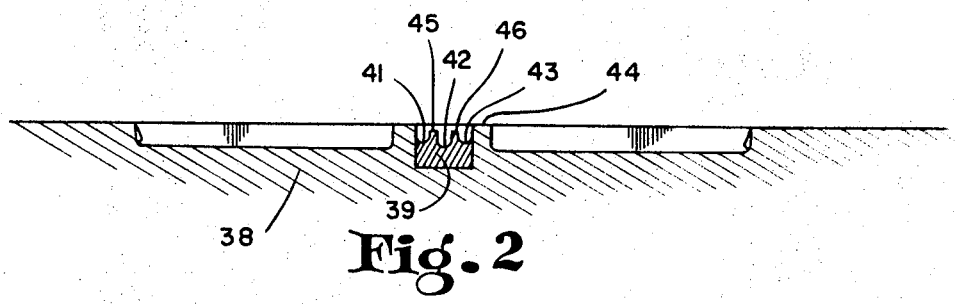
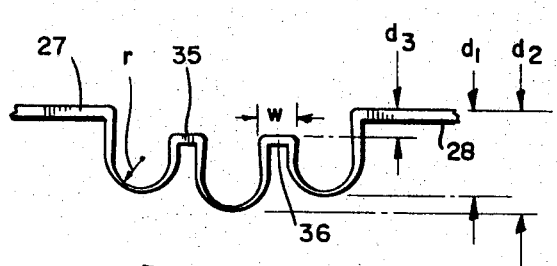 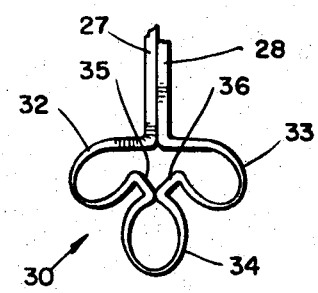
Fig. 3    Fig. 4
INVENTOR.
TIMOTHY E. DEARTH
BY
ATTORNEY

United States Patent Office 3,616,487
Patented Nov. 2, 1971

3,616,487
BOX HINGE
Timothy E. Dearth, Indianapolis, Ind., assignor to
Eli Lilly and Company, Indianapolis, Ind.
Filed Mar. 10, 1969, Ser. No. 805,466
Int. Cl. E05d 9/00
U.S. Cl. 16—150                                              1 Claim

ABSTRACT OF THE DISCLOSURE

A hinge design formed from plastic sheet material susceptible to formation by heat and pressure whereby two flush surfaces may be integrally hinged. The hinge is formed by conforming plastic sheet material into three longitudinal valleys in a mold which are separated by a pair of longitudinal ridges.

BACKGROUND OF THE INVENTION

In the container and packaging fields, production techniques frequently referred to as pressure forming, thermoforming and vacuum forming of plastic sheet material have been widely adopted. Usually, the plastic sheet material is from about 5 mils to 30 mils in thickness and is a vinyl, acetate or similar composition susceptible of being formed by applying heat and force such as pressure forming or vacuum forming. Numerous shapes of lightweight containers can be formed in this manner. The plastic sheet material is relatively tough, flexible and semirigid. However, heretofore efforts to form integrally hinged covers and receptacles have been unsatisfactory.

In particular, hinges which are capable of flexing at least 180° have been proposed by employing cutout portions in a fold in the plastic sheet material. Although such cutouts along a creased portion of the material enhance the hinge's flexibility, the hinge is also weakened and is more susceptible to tearing. Hinges with a curved cross section have also been formed from plastic sheet material, thereby avoiding a sharp edge that is subjected to stress. However, these round types of hinges prevent the mating surfaces or edges of the box from staying flush with each other since the use of such a curved or rolled surface for the hinge causes bowing of the adjacent mating edges. This unwanted bowing can be partially avoided by providing a sharp crease in the sheet material to serve as a hinge. Unfortunately, this type of arrangement, when subjected to several flexing actions, tends to break and tear.

SUMMARY OF THE INVENTION

Briefly, my invention comprises the forming of a hinge from plastic sheet material whereby the hinge has a pair of outer hollow and parallel valleys which extend outwardly along the length of the hinge. Each of these outer loops has a first side connected to one of the mating surfaces of the box and has a second side connected to an adjacent ridge which is parallel to the valleys. A middle valley is formed between the two ridges. This unique configuration provides a hinge that is capable of withstanding many flexing operations extending over at least a 180° range. The three valley surfaces absorb the various forces resulting from flexing the hinge and prevent any tearing or unwanted strain on the hinge. In addition, these three hinge surfaces cooperate to maintain the two mating surfaces of the container flush without any bowing effect.

Thus, it is one object of this invention to provide a new and improved hinge formed from plastic sheet material. Another object of this invention is to provide a method for forming a hinge from plastic sheet material in accordance with conventional thermoforming techniques. Other objects and advantages of this invention will be apparent upon reading the following descriptions in connection with the drawing.

BRIEF DESCRIPTION OF THE DRAWING

FIG. 1 is a perspective view of a box with the integral hinge of this invention;

FIG. 2 is a partial view of a mold for forming the box and hinge of FIG. 1 taken in cross section on a line transversing the cover and box mold elements;

FIG. 3 is an end view of the hinge of this invention as it appears when removed from the mold; and FIG. 4 is an end view of the hinge when its associated cover and bottom are closed.

DETAILED DESCRIPTION OF INVENTION

Referring to the drawing, a container 11 is illustrated which in the particular embodiment comprises a rectangular box. Container 11 has a cover 13 and a base 14. Cover 13 and base 14 are similar in configuration with respective top and bottom surfaces 16 and 17, side walls 19 and 20, front walls 24 and 25, rear walls (not visible) and abutting flanges 27 and 28 extending about the peripheries of the container's walls.

It is to be understood that the invention described herein is applicable to a variety of containers, receptacles and the like and is not restricted to the particular type container shown in the drawing. Cover 13 and base 14 are integrally joined by hinge 30. It is to be noted that this hinge has a pair of hollow and parallel outer valleys 32 and 33 (FIGS. 1 and 4) which extend outwardly along the length of the container. Each of these valleys has an arcuate cross section thereby avoiding a sharp creased effect. A middle hollow valley 34 is connected to the outer valleys by a pair of ridges 35 and 36.

Outer valley 32 is connected to flange 27 adjacent the cover's rear wall. Likewise, valley 33 is connected to flange 28 on base 14. Valleys 32 and 33 are also connected along their lengths to middle valley 34 by ridges 35 and 36. As shown in FIG. 3, middle valley 34 is deeper than outer valleys 32 and 33. The degree of curvature for the three arcuate valleys may be identical and may approximate a 180° arc. Ridges 35 and 36 may be of identical configuration and dimension.

In forming the hinge of this invention by conventional thermoforming techniques, a mold 38 is used which has a removable inset die 39 (FIG. 2). Formed into this die are three parallel arcuate recesses 41, 42 and 43 which will form the three arcuate valleys 32, 33 and 34 of the hinge. Positioned between these three recesses are two upwardly extending longitudinal ridges 45 and 46. The height of the ridges should not extend above (and preferably be lower than) the mold's adjacent top surface 44. The width of these ridges is preferably less than the radius for the arcuate recesses 41, 42 and 43.

One set of dimensions for a satisfactory hinge is as follows, referring to FIG. 3:

$r$ (radius of each valley) = .062 inch
$w$ (width of ridge) = .0312 inch
$d_1$ (depth of outer valleys 32 and 33) = .150 inch
$d_2$ (depth of middle valley 34) = .187 inch
$d_3$ (depth of ridges) = .062 inch The above dimensions have been found satisfactory for a variety of plastic sheet materials including styrene and propionate of a thickness as thin as .005 inch to .035 inch. When these dimensions are increased proportionately, sheet material as thick as .060 inch may utilize the hinge of this invention.

Thus, it can be seen from FIG. 3 that the integrally connected cover and base of the receptacle are formed in substantially one primary horizontal plane. This forming occurs by placing a flat sheet of plastic material of the desired thickness over the top of the mold. During the application of heat and pressure and/or vacuum, the flat sheet material is deformed to assume the configuration comprising the recesses and ridges in the mold surface.

After the sheet material has been accordingly formed and cooled, it may be removed from the mold surface. The formed sheet material may, after trimming, be immediately folded along its hinged portion with the outer or top surfaces of flanges 27 and 28 doubled onto each other to assume the inner surfaces of the container. This folding action results in the valleys 32, 33 and 34 extending outwardly with the ridges 35 and 36 converging inwardly. When the receptacle is closed the hinge assumes an appearance in cross section of a three-leaf clover (FIG. 4). In this folded position the three valleys are partially distorted and elongated but basically unstressed. Thus, ridges 35 and 36 are dimensioned to a length whereby they are not urging against each other. In FIG. 4 these ridges barely touch each other and do not provide any resistance against the butting of surfaces 27 and 28.

It has been found that the natural unstressed position assumed by the hinge is that of FIG. 1 and that there is no significant resisting force against the desired abutment of flanges 27 and 28. Despite the fact that the valleys are molded in the position of FIG. 3, there is an inherent tendency to assume the position of FIG. 4. This can be largely attributed to the reduced thickness of the sheet material in the vicinity of the valleys' apexes. This reduced thickness is caused by the drawing or forming technique which stretches the sheet material a greater distance before it contacts the bottom of the mold recesses 41, 42 and 43. When extruded sheet material is used, it is possible that the lines of extrusion will run parallel to the hinge. The stretching of the material forming the valleys will cause reorientation of these lines whereby they will traverse the hinge and substantially increase the hinge's flex life.

Thus, a light-weight container has been formed which requires no significant assembly time in view of its integral construction. The container has a hinge which will last the normal expected life of the container without tearing. The mating surfaces of the cover and base are flush to each other and can be kept in this position by any of a number of means such as the use of undercut corners. However, the particular container has been designed to remain in a closed condition by the cooperation of four recessed lugs 51 which inwardly protrude from front walls 24 and 25. These lugs are forced against the article to be packaged in the container such as a rectangular magnetic tape cassette (not illustrated). The cassette or other article is of such dimensions as to closely proximate the rectangular cavity defined between cover 13 and base 14. Thus, the article serves to maintain the two flanges 27 and 28 in a closed position. It is apparent that the precise dimensions of the valleys and ridges of hinge 23 will vary depending on the thickness of the sheet material and the size of the container. In particular, sheet material thicknesses ranging between five and sixty mils are particularly suitable for this type of hinge construction.

Although only one embodiment of this invention has been illustrated and described, it will be apparent to those with skill in the art that modifications can be made without departing from the spirit of the invention and the scope of the appended claims.

I claim:

1. A hinge integrally joining a pair of flush surfaces of a container formed from a plastic sheet material deformable by heat and pressure, said hinge extending along substantially the full length of a straight side of said container and comprising a pair of outer hollow and parallel valleys outwardly extending along substantially the length of said hinge and connected to said flush surfaces, a middle hollow valley outwardly extending between said outer valleys and connected thereto by a pair of parallel ridges formed with flat surfaces lying in a plane below and parallel to the plane of said flush surfaces, said middle valley being slightly deeper than said outer valleys with all of said valleys having a radius curvature in their initial formed position, and said ridges converging to an adjacent relationship when said pair of surfaces are butted flush to each other.

References Cited

UNITED STATES PATENTS

| | | | |
|---|---|---|---|
| 2,746,087 | 5/1956 | Dolezal | 16—150 UX |
| 2,845,104 | 7/1958 | Frankel | 16—150 UX |
| 3,343,864 | 9/1967 | Baer | 16—150 X |

BOBBY R. GAY, Primary Examiner

P. A. ASCHENBRENNER, Assistant Examiner

U.S. Cl. X.R.

220—31